US008570899B2

(12) United States Patent
Medynski et al.

(10) Patent No.: US 8,570,899 B2
(45) Date of Patent: Oct. 29, 2013

(54) PROVISIONING FOR ENTERPRISE SERVICES

(75) Inventors: Paul Franklin Medynski, Halifax (CA); Richard John George, Waterloo (CA)

(73) Assignee: BlackBerry Limited, Waterloo (CA)

( * ) Notice: Subject to any disclaimer, the term of this patent is extended or adjusted under 35 U.S.C. 154(b) by 388 days.

(21) Appl. No.: 12/778,820

(22) Filed: May 12, 2010

(65) Prior Publication Data

US 2011/0280151 A1    Nov. 17, 2011

(51) Int. Cl.
*H04L 12/28*    (2006.01)

(52) U.S. Cl.
USPC .......................................................... 370/254

(58) Field of Classification Search
None
See application file for complete search history.

(56) References Cited

U.S. PATENT DOCUMENTS

| 7,110,516 | B2 | 9/2006 | Sarp et al. | |
| 7,382,872 | B2 | 6/2008 | Bedingfield | |
| 2004/0066926 | A1* | 4/2004 | Brockbank et al. | 379/207.13 |
| 2009/0003316 | A1* | 1/2009 | Lee et al. | 370/352 |

FOREIGN PATENT DOCUMENTS

| DE | 102004012503 A1 | 10/2005 |
| EP | 1098500 A2 | 5/2001 |
| EP | 2009887 A1 | 12/2008 |
| WO | 2006070187 A1 | 7/2006 |
| WO | WO 2006070187 A1 * | 7/2006 |

OTHER PUBLICATIONS

Extended European Search Report mailed Dec. 6, 2010. In corresponding application No. 10162733.9.
Sulkin, et al. PBX Systems for IP Telephony-Migrating Enterprise Communications—Chapter 6—Legacy PBX Common Equipment, 2002, McGraw-Hill, XP002605823, ISBN: 0-07-137568-6 pp. 122-145, the whole document.
RIM MVS Solution—Blackberry Mobile Voice System—MVS Business Phone Solutions. http://us.blackberry.com/business/software/mvs. pp. 1-3.
Linksys 941/942 Phone—Advanced, affordable, feature rich IP telephone for SOHO and small Business.

* cited by examiner

*Primary Examiner* — Chi Pham
*Assistant Examiner* — Kouroush Mohebbi
(74) *Attorney, Agent, or Firm* — Novak Druce Connolly Bove + Quigg LLP (57) ABSTRACT

Configuring a communication system. Configuring a Private Branch eXchange (PBX) system to respond to a configuration telephone number by routing call control for the configuration number to an Service Management Platform (SMP). Determining an enterprise extension associated with an enterprise account in the domain of the SMP. Directing a mobile communication device associated with the enterprise account to call the configuration telephone number, and to communicate the determined enterprise extension and an authentication token of the enterprise account. Receiving, at the PBX system, a call on the configuration telephone number. Routing the call to the SMP. Receiving the determined enterprise extension at the SMP. Determining the PBX system port of the call. Directing the mobile communication device to communicate the authentication token. Receiving the authentication token. Upon receipt of an authentication token equivalent to the directed authentication token, associating the enterprise account with the determined PBX system port.

19 Claims, 7 Drawing Sheets

PROVISIONING FOR ENTERPRISE SERVICES

FIELD

The technology disclosed herein (the "technology") relates to communication system configuration. Exemplary embodiments of the technology relate to determining a communications path between an enterprise-associated mobile communications device and an enterprise resource.

BRIEF DESCRIPTION OF THE DRAWINGS

Reference will now be made, by way of example, to the accompanying drawings which show example embodiments of the present application.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the technology. For instance, features described as part of one embodiment can be used on another embodiment to yield a still further embodiment. Thus, it is intended that the present technology cover such modifications and variations that come within the scope of the technology.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Figure 1:
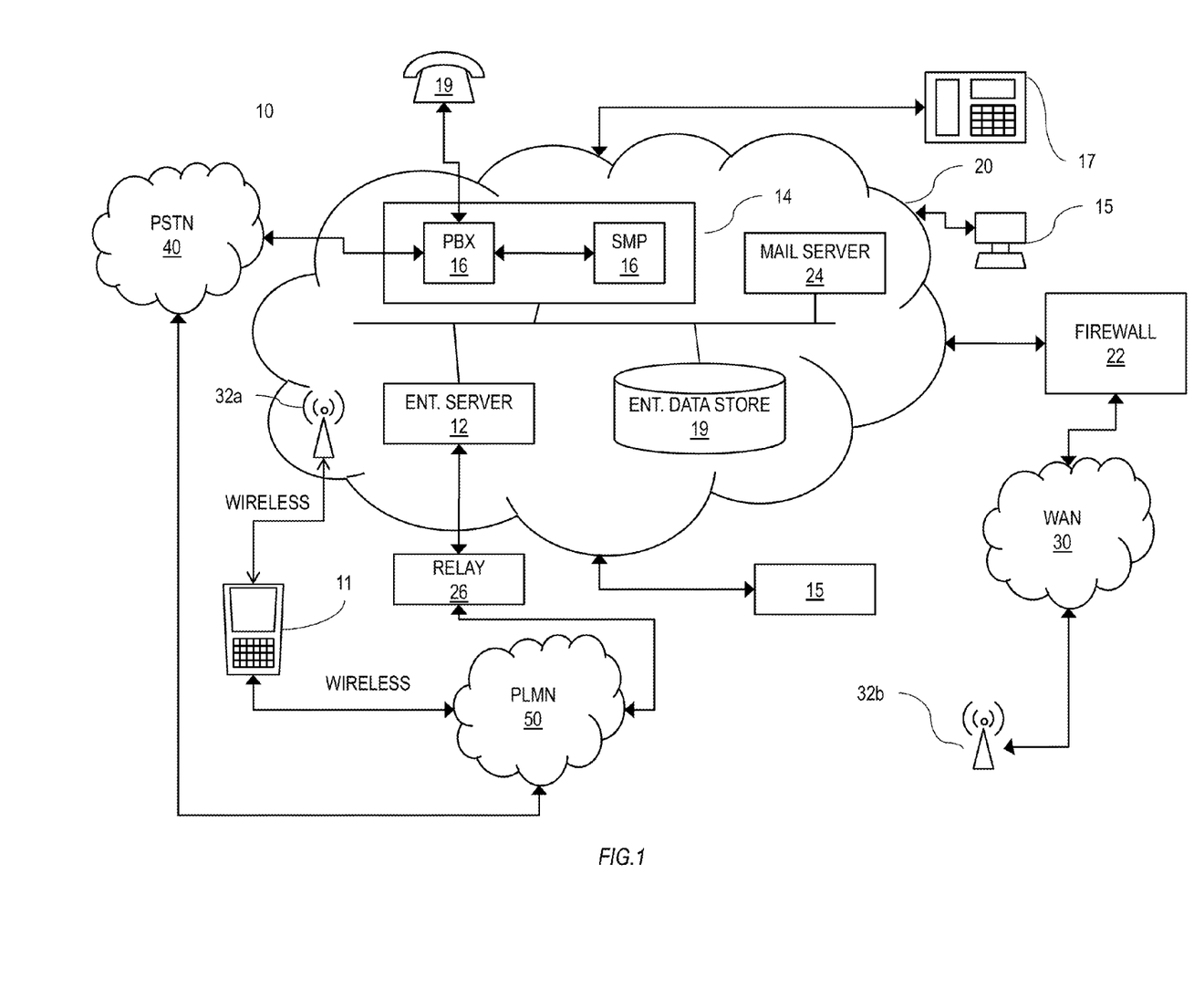
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as a user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is information such as: message address information, such as an e-mail address; and enterprise telephone exchange, e.g., a phone exchange that can be associated with a digital telephone set, e.g., 17. Information on users of the enterprise network 24 and its resources can be stored in an enterprise data store 19, e.g., implemented with Microsoft® Active Directory. Messages addressed to a user message address are stored on the enterprise network 20 in the mail server 24. The messages may be retrieved by a user using a messaging application, such as an e-mail client application. The messaging application may be operating on a user's computer 15 connected to the enterprise network 20 within the enterprise. In some embodiments, a user may be permitted to access stored messages using a remote computer, for example at another location via the WAN 30 using a VPN connection. Using the messaging application, a user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to a user's mobile device 11 and to relay incoming e-mail messages composed and sent via the mobile device 11 to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on a computer 15.

As is typical in many enterprises, the enterprise network 20 includes a Private Branch eXchange system (although in various embodiments the PBX may be a standard PBX or an IP-PBX, for simplicity the description below uses the term PBX system to refer to both) 16 having a connection with the PSTN 40 for routing incoming and outgoing voice calls for the enterprise. The PBX system 16 is connected to the PSTN 40 via DID trunks or PRI trunks, for example. The PBX system 16 may use ISDN signaling protocols for setting up and tearing down circuit-switched connections through the PSTN 40 and related signaling and communications. In some embodiments, the PBX system 16 may be connected to one or more conventional analog telephones 19. The PBX system 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX system 16 to the PSTN 40 or incoming from the PSTN 40 to the PBX system 16 are typically circuit-switched calls. Within the enterprise, e.g., between the PBX system 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX system 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX system 16, and, in some embodiments, the DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
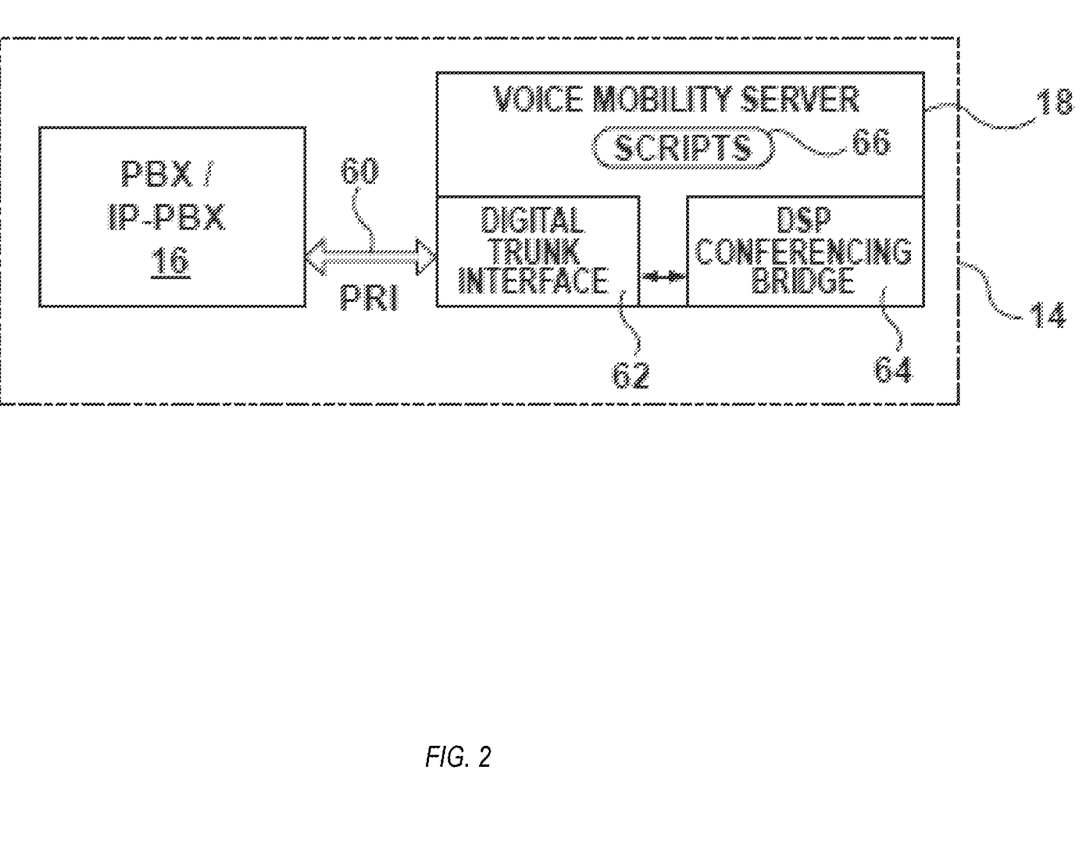
FIG. 2 shows, in block diagram form, further details of an embodiment of the enterprise communication platform.
Figure 3:
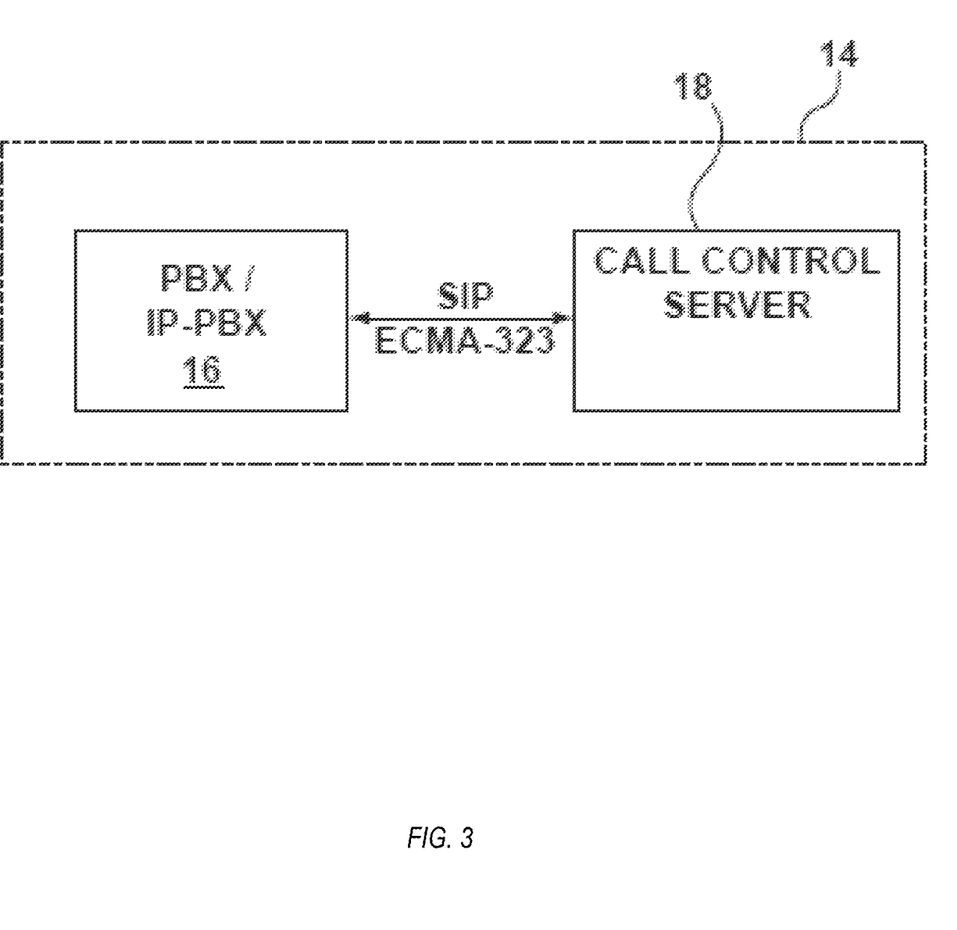
FIG. 3 shows another embodiment of the enterprise communications platform.
Figure 4:
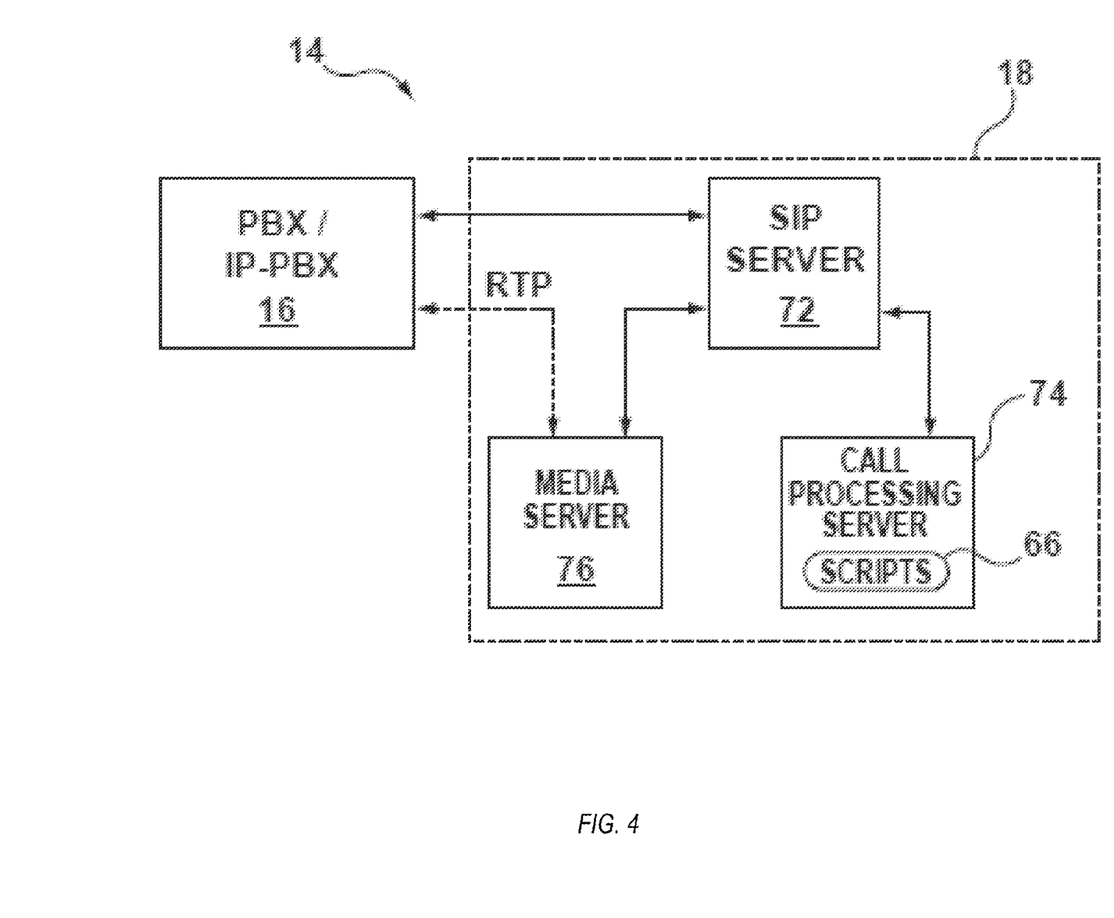
FIG. 4 shows yet another embodiment of the enterprise communications platform.

Reference is now made to FIGS. 2 to 4, which show example embodiments of the enterprise communications platform 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX system 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX system 16 and the SMP 18.

In this embodiment, the SMP 18 assumes control over both call processing and the media itself. This architecture may be referred to as "First Party Call Control". Many of the media handling functions normally implemented by the PBX system 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in memory and executed by the processor of the SMP 18. The scripts 66 may implement call flow logic, business logic, user preferences, call service processes, and various feature applications.

FIG. 3 shows another embodiment in which the PBX system 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX system 16, for example through the LAN, enabling packet-based communications and, more specifically, IP-based communications. In one embodiment, communications between the PBX system 16 and the call control server 18 are carried out in accordance with SIP. In other words, the call control server 18 uses SIP-based communications to manage the set up, tear down, and control of media handled by the PBX system 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP). Other architectures or configurations for the enterprise communications system 14 will be appreciated by those ordinarily skilled in the art.

Figure 5:
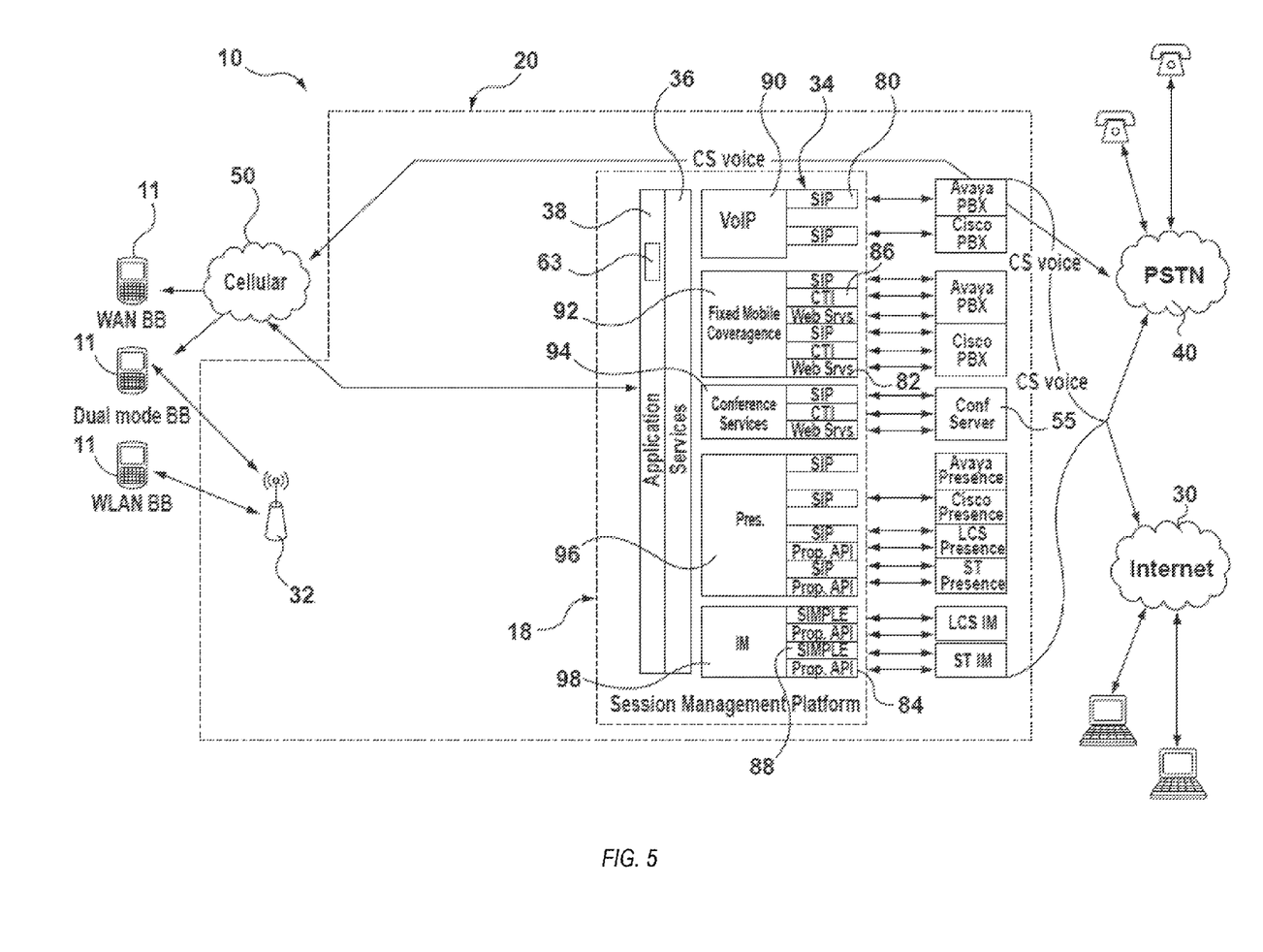
FIG. 5 shows further details of the enterprise communications platform of FIG. 3.

Reference is now made to FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed to the communication devices and that leverage services and interface protocols for enabling the applications.

Specifically, the protocol layer 34 can include protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service or a conference service, or combinations thereof.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. The conference call server 55 is configured for directing media and data streams to and from one or more communication devices (i.e., mobile devices 11, telephones 17, and computers 15).

A given SMP 18 is typically connected to a plurality of PBX system 16 ports, e.g., on the same network and communicating via SIP. A given SMP 18 can manage calls for many, e.g., hundreds, of user devices 11. The number of user devices 11 handled by an SMP is typically much greater than the number of PBX system 16 ports directed to an SMP 18. Instead of configuring the SMP 18 for each user device, embodiments of the present technology leverage existing voice and data infrastructure (including a configured PBX system 16) to associate a user device with a PBX system 16 port entering the SMP 18.

Figure 6:
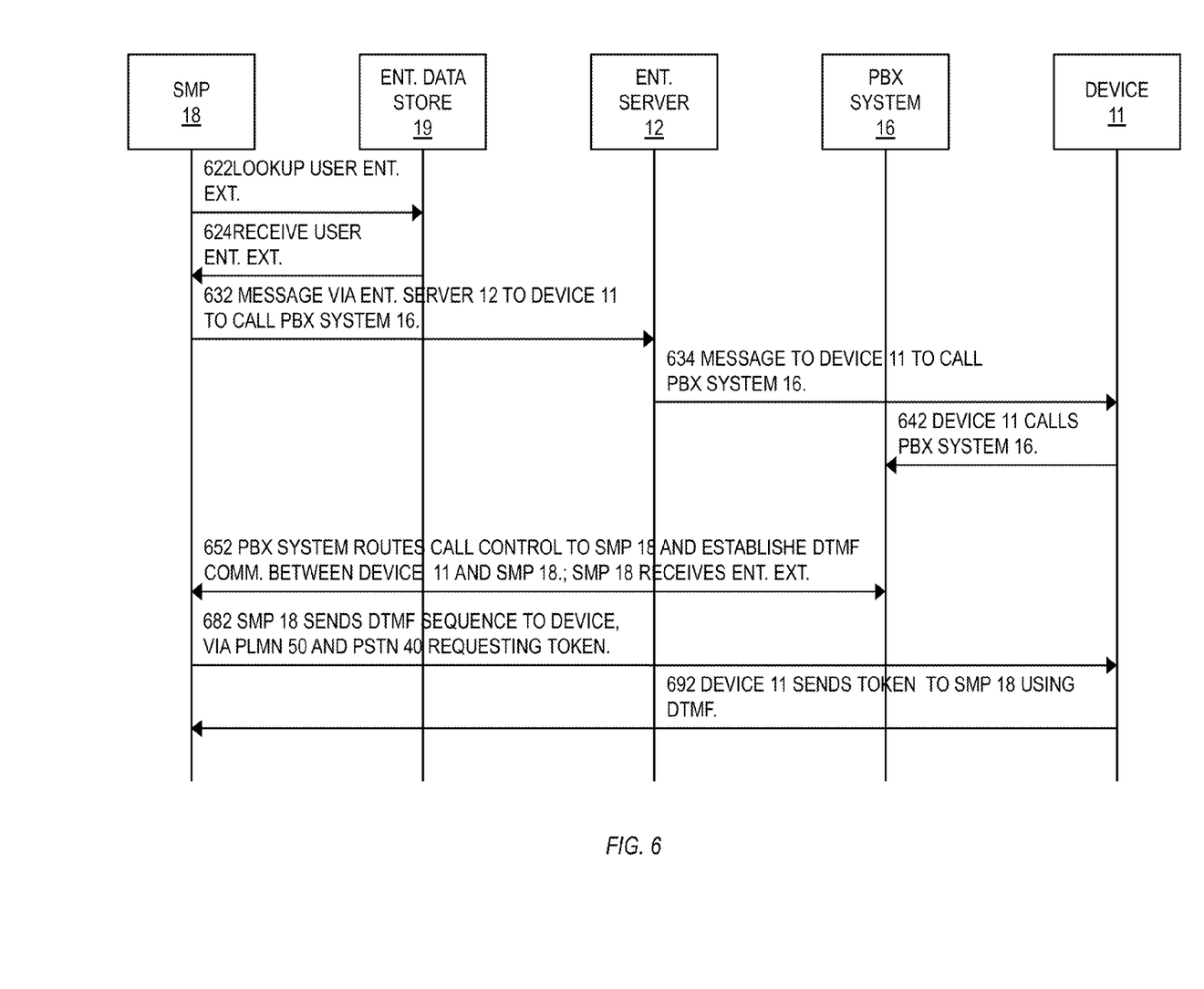
FIG. 6 illustrates methods of the technology in an informal message sequence chart.
Figure 7:
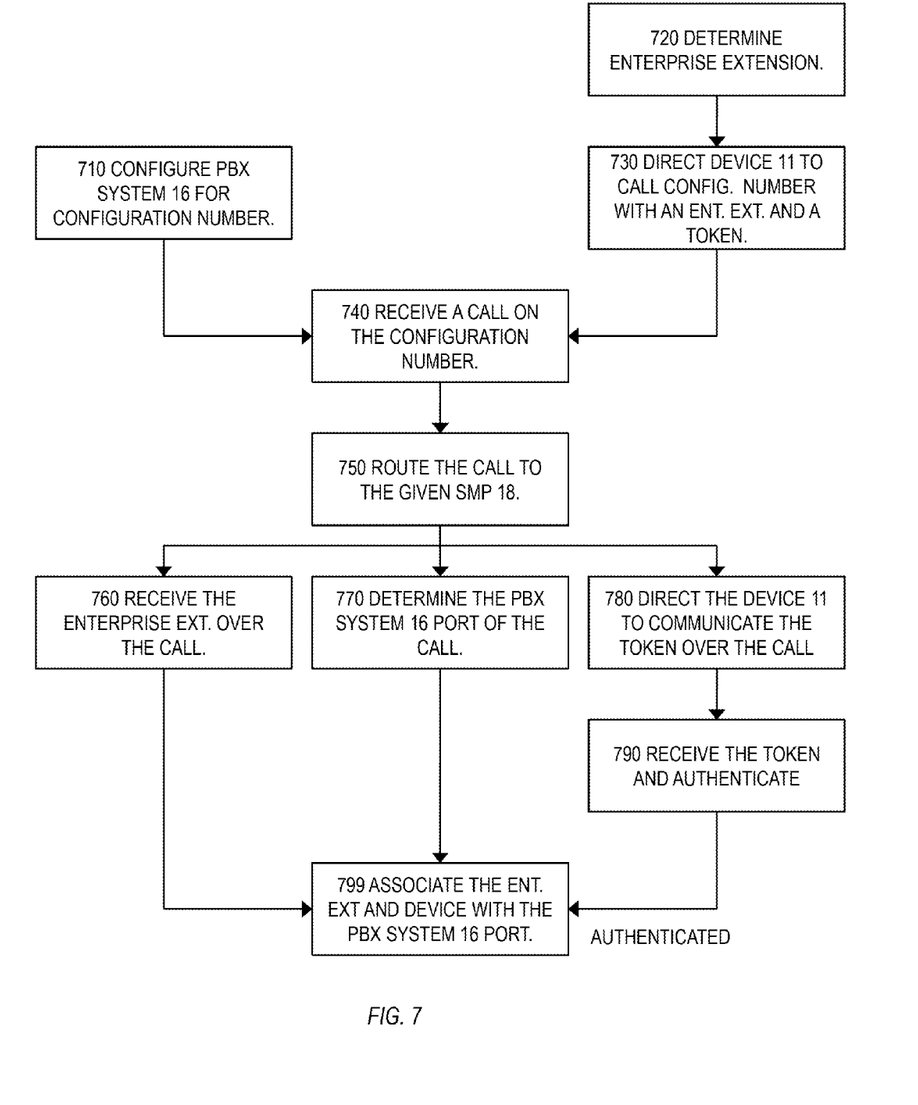
FIG. 7 illustrates methods of the technology.

Referring to FIG. 6 and FIG. 7, messages and methods of the technology are illustrated in a signal ladder and flow chart, respectively.

For a given SMP 18, the PBX system 16 can be configured 710 to respond to a predetermined telephone number, e.g., a configuration number, by routing call control for the configuration number to the given SMP 18 and conveying messages, e.g., DTMF signals, between the calling device 11 and that SMP 18.

The given SMP 18 can determine the enterprise extension associated with an enterprise account (e.g., a account of an enterprise network user) under its management 720, e.g., the SMP can query (622) an enterprise user database 19, e.g., on the enterprise network 20, with a user identifier and receive (624) an enterprise extension of that user in response. In some embodiments, a network resource other than an SMP can determine the enterprise extension associated with a user.

The given SMP 18 can, e.g., using messaging, direct a device 11 associated with a user to place a call to the configuration number 730. The message can contain the enterprise number of a user, and an authentication token. The authentication token later can be used to verify that a certain response (described below) is indeed from an enterprise device 11 associated with a user. The given SMP 18 can send the message through the enterprise server 12 (632), then via the PLMN 50 to the device 11 (634). In some embodiments, a network resource other than the given SMP 18 can direct the device 11 to call the configuration number.

The device 11 can receive the message, and in response, can place a call (642), typically via the PLMN 50 and the PSTN 40 to the configuration telephone number at the PBX system 16. The PBX can receive the call 740 on the configuration number.

The PBX system 16 can respond to a call on the incoming predetermined telephone number by routing call control for the call to the given SMP 18 and establishing two-way communication 750 (652), e.g., DTMF, between the device 11 and the given SMP 18. While DTMF communication is used in this description of enabling embodiments, the technology includes other forms of communication between a device 11 and an SMP 18 via the PBX system 16, e.g., SIP messages.

The device 11 can then communicate the enterprise number (652), e.g., via DTMF, as the payload of a SIP message, to the given SMP 18. The given SMP 18 receives the enterprise extension number 760. In some embodiments, the given SMP 18 commands the device 11 to communicate the enterprise number.

The given SMP 18 can determine the particular PBX system 16 port providing the communication, e.g., by noting the port over which communication occurs, by examining data or metadata of the communication from the PBX system 16.

The given SMP 18 can command 780 the device 11 to communicate the authentication token to the given SMP 18, e.g., using message (682). The device 11 sends the communication token, e.g., via DTMF using message (692). In some embodiments, a command for the authentication token is not required, i.e., the device 11 communicates the token to the given SMP 18 without command.

The SMP 18 can receive the sent communication token, and compare it with the token created for this device 11. A positive comparison authenticates that the token sender is device 11. Upon a positive comparison, the given SMP 18 associates the PBX system 16 port with the enterprise extension, thereby configuring the given SMP 18 for that user device.

The given SMP 18 does this for a plurality of users under its management. In some embodiments, the plurality of users for which this is done is substantially greater than the number of PBX system 16 ports terminating at that SMP 18. In some embodiments, portions of the technology (though described herein as being executed in the given SMP 18), e.g., token generation, token comparison, association of an enterprise number with a particular PBX system 16 port, can be performed on other network resources. Systems of the technology can comprise hardware and functionality described above along with software for implementing the methods.

In some embodiments, a given SMP 18 places a call through the PBX system 16 to a device associated with an enterprise extension controlled by the given SMP 18. Configuration information (e.g., PBX system 16 port) is associated with the device and the enterprise extension in this fashion, and communicated to the given SMP 18, e.g., via the PLMN 50 and the enterprise server 12.

The following example provides further illustration of embodiments of the technology in the context of FIG. 1, FIG. 3, and FIG. 5. An enterprise address book is established, e.g., in the enterprise data store 19, to contain data on each user to be configured for enterprise services, e.g., services provide by an SMP to extend enterprise telephony functions to enterprise-associated mobile devices 11. An enterprise phone extension is listed in the address book for each such user.

The PBX system 16 is configured to recognize calls made to a configuration number unique to a given SMP 18, and route call received on that number to that SMP 18. For each user account managed at a given SMP 18, a mobile device 11 associated with the user account is directed to call back into the configuration number, e.g., using the PLMN-PSTN communication path between the device 11 and the PBX system 16.

For configuring the communication path of a device associated with a user account managed by a given SMP, a message is sent to the enterprise-associated mobile device 11 associated with the enterprise extension to place a call to the configuration number, and then enter, via DTMF, the enterprise phone extension. The PBX system 16 routes the call to the SMP associated with that configuration number. The SMP records the desired meta-data that accompanies the call, which includes the PBX system 16 port over which that the device 11 communicates with the given SMP 18.

The given SMP 18 has now established a mapping between the enterprise account for the user, the enterprise extension for the user, the enterprise-associated mobile device 11 for the user, and the PBX system 16 port that handles communications for that enterprise extension and mobile device 11. The SMP 18 can now register for enterprise phone services on behalf of the user, and extend the enterprise phone experience out to the user's device 11.

The present technology can take the forms of hardware, software or both hardware and software elements. In some embodiments, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof).

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

The invention claimed is:

1. A computer-implemented method for configuring a communication system, the method comprising:
   configuring a Private Branch eXchange (PBX) system to respond to a configuration telephone number by routing call control for the configuration number to a predetermined Service Management Platform (SMP), wherein the configuration number is uniquely assigned to the SMP;
   determining at the SMP, an enterprise extension associated with an enterprise account in the domain of the SMP;
   directing by the SMP, a mobile communication device associated with the enterprise account to call the configuration telephone number, and to communicate the determined enterprise extension and an authentication token of the enterprise account;
   receiving, at the PBX system, a call on the configuration telephone number;
   routing by the PBX system, the call to the SMP, the SMP recording meta-data accompanying the call;
   receiving the determined enterprise extension at the SMP;
   determining at the SMP, the PBX system port of the call based on the recorded metadata;
   directing the mobile communication device to automatically communicate the authentication token without command by the SMP and without command by a user;
   receiving the authentication token at the SMP, the authentication token having been automatically communicated without command;
   upon receipt at the SMP of an authentication token equivalent to the directed authentication token, associating the enterprise account with the determined PBX system port; and
   registering, by the SMP, the mobile communication device for enterprise services associated with the enterprise account.

2. The computer-implemented method of claim 1 wherein: configuring a PBX system further comprises:
   configuring the PBX system to respond to the configuration telephone number by establishing a two-way communication path between the calling device and the SMP via the PBX; and
directing the device, and receiving the authentication token, are performed via the two-way communication path.

3. The computer-implemented method of claim 2 wherein: communication over the two way communication path comprises dual-tone multi-frequency (DTMF) signaling.

4. The computer-implemented method of claim 1:
further comprising directing the device to communicate the determined enterprise extension, and
wherein, the determined enterprise extension is received only in response to directing the device to communicate the determined enterprise extension.

5. The computer-implemented method of claim 1 wherein: directing the device to communicate the authentication token and receiving the authentication token are performed via a communication path via an enterprise server, through a public land-mobile network (PLMN), to the device.

6. A computer program product for configuring a communication system, the computer program product comprising:
   at least one non-transitory computer readable medium; and
   at least one program module,
      stored on the at least one medium, and
      operative, upon execution by at least one processor for:
         configuring a Private Branch eXchange (PBX) system to respond to a configuration telephone number by routing call control for the configuration number to a predetermined Service Management Platform (SMP), wherein the configuration number is uniquely assigned to the SMP;
         determining at the SMP, an enterprise extension associated with an enterprise account in the domain of the SMP;
         directing by the SMP, a mobile communication device associated with the enterprise account to call the configuration telephone number, and to communicate the determined enterprise extension and an authentication token of the enterprise account;
         receiving, at the PBX system, a call on the configuration telephone number;
         routing by the PBX system, the call to the SMP, the SMP recording metadata accompanying the call;
         receiving the determined enterprise extension at the SMP;
         determining at the SMP, the PBX system port of the call based on the recorded meta-data;
         directing the mobile communication device to automatically communicate the authentication token without command by the SMP and without command by a user;
         receiving the authentication token at the SMP, the authentication token having been automatically communicated without command;
         upon receipt at the SMP of an authentication token equivalent to the directed authentication token, associating the enterprise account with the determined PBX system port; and registering, by the SMP, the mobile communication device for enterprise services associated with the enterprise account.

7. The computer program product of claim 6 wherein:
configuring a PBX system further comprises:
configuring the PBX system to respond to the configuration telephone number by establishing a two-way communication path between the calling device and the SMP via the PBX; and
directing the device, and receiving the authentication token, are performed via the two-way communication path.

8. The computer program product of claim 7 wherein:
communication over the two way communication path comprises dual-tone multi-frequency (DTMF) signaling.

9. The computer program product of claim 6:
further comprising directing the device to communicate the determined enterprise extension, and
wherein, the determined enterprise extension is received only in response to directing the device to communicate the determined enterprise extension.

10. The computer program product of claim 9 wherein:
directing the device to communicate the authentication token and receiving the authentication token are performed via a communication path via an enterprise server, through a public land-mobile network (PLMN), to the device.

11. A system for configuring a communication system, the system comprising:
at least one processor,
at least one non-transitory computer readable medium in communication with the processor;
at least one program module,
stored on the at least one medium, and operative upon execution by the processor for:
configuring a Private Branch eXchange (PBX) system to respond to a configuration telephone number by routing call control for the configuration number to a predetermined Service Management Platform (SMP), wherein the configuration number is uniquely assigned to the SMP;
determining at the SMP, an enterprise extension associated with an enterprise account in the domain of the SMP;
directing by the SMP, a mobile communication device associated with the enterprise account to call the configuration telephone number, and
to communicate the determined enterprise extension and an authentication token of the enterprise account;
receiving, at the PBX system, a call on the configuration telephone number;
routing by the PBX system, the call to the SMP, the SMP recording metadata accompanying the call;
receiving the determined enterprise extension at the SMP;
determining at the SMP, the PBX system port of the call based on the recorded meta-data;
directing the mobile communication device to automatically communicate the authentication token without command;
receiving the authentication token at the SMP, the authentication token having been automatically communicated without command by the SMP and without command by a user;
upon receipt at the SMP of an authentication token equivalent to the directed authentication token, associating the enterprise account with the determined PBX system port; and
registering, by the SMP, the mobile communication device for enterprise services associated with the enterprise account.

12. The system of claim 11 wherein:
configuring a PBX system further comprises:
configuring the PBX system to respond to the configuration telephone number by establishing a two-way communication path between the calling device and the SMP via the PBX; and
directing the device, and receiving the authentication token, are performed via the two-way communication path.

13. The system of claim 12 wherein:
communication over the two way communication path comprises dual-tone multi-frequency (DTMF) signaling.

14. The system of claim 11:
further comprising directing the device to communicate the determined enterprise extension, and
wherein, the determined enterprise extension is received only in response to directing the device to communicate the determined enterprise extension.

15. The system of claim 12 wherein:
directing the device to communicate the authentication token and receiving the authentication token are performed via a communication path via an enterprise server, through a public land-mobile network (PLMN), to the device.

16. The system of claim 12 wherein:
communication over the two way communication path comprises dual-tone multi-frequency (DTMF) signaling; and
directing the device to communicate the authentication token and receiving the authentication token are performed via a communication path via an enterprise server, through a public land-mobile network (PLMN), to the device.

17. The system of claim 11 wherein:
further comprising directing the device to communicate the determined enterprise extension, and
wherein, the determined enterprise extension is received only in response to directing the device to communicate the determined enterprise extension, and
wherein configuring a PBX system further comprises:
configuring the PBX system to respond to the configuration telephone number by establishing a two-way communication path between the calling device and the SMP via the PBX; and
directing the device, and receiving the authentication token, are performed via the two-way communication path.

18. The system of claim 11 wherein the PBX is any one of a standard type PBX or an internet protocol (IP) type PBX.

19. The system of claim 11 wherein the determining an enterprise extension associated with an enterprise account in the domain of the SMP further comprises referencing a list of extension numbers in a private numbering plan (PNP).

* * * * *